United States Patent [19]
Zikria

[11] Patent Number: 4,789,340
[45] Date of Patent: Dec. 6, 1988

[54] SURGICAL STUDENT TEACHING AID

[76] Inventor: Bashir A. Zikria, 196 Millbrook Cir., Norwood, N.J. 07648

[21] Appl. No.: 86,533

[22] Filed: Aug. 18, 1987

[51] Int. Cl.$^4$ ............................................. G09B 23/26
[52] U.S. Cl. .................................. 434/272; 434/262; 434/268
[58] Field of Search ......................... 434/272, 262, 268

[56] References Cited

U.S. PATENT DOCUMENTS

| | | | |
|---|---|---|---|
| 2,704,897 | 3/1955 | Lade | 434/272 |
| 2,871,579 | 2/1959 | Niiranen et al. | 434/268 |
| 2,871,584 | 2/1959 | Poole | 434/268 |
| 2,995,832 | 8/1961 | Alderson | 434/268 |
| 3,775,865 | 12/1973 | Rowan | 434/262 |
| 3,852,893 | 12/1974 | Smrcka | 434/268 |
| 4,321,047 | 3/1982 | Landis | 434/262 |

OTHER PUBLICATIONS

Exercise & Drill Boards for Surgical Training . . . , Zikria, Amer. Journal of Surgery, vol. 141, 5/81.

Primary Examiner—James C. Yeung
Attorney, Agent, or Firm—Evelyn M. Sommer

[57] ABSTRACT

A teaching aid is provided to enable medical students to practice various surgical techniques. The teaching aid comprises a multi-compartment tray, with the various compartments being devoted to teaching one or more distinct surgical techniques. A plurality of the compartments may comprise simulated tissues removably and replaceably mounted therein, such as simulated skin tissue, simulated blood vessels, simulated intestinal tissue and/or simulated tendons or nerves. Other compartments of the teaching aid may comprise hooks about which knot tying techniques may be practiced. Still other compartments may comprise simulated tissues that must be tensioned prior to suturing.

22 Claims, 2 Drawing Sheets

SURGICAL STUDENT TEACHING AID

BACKGROUND OF THE INVENTION

Medical, dental and veterinary students as well as more experienced doctors learning new surgical techniques must undergo extensive training before they are qualified to perform surgery on human patients. The training must teach the medical student proper techniques for cutting through various types of tissue, for clamping blood vessels severed during the surgery and for suturing severed tissue. In particular, the medical student as well as the other aforementioned persons must gain experience in suturing a broad variety of tissue types, including blood vessels, nerves, tendons, ligaments, and such.

The range of possibilities that are likely to be encountered by the surgeon are extremely great. For example, the contour of the portion of the body on which the surgery is being performed will vary greatly from one part of the body to another. The thickness and consistency of the various layers through which the surgeon must cut will also vary substantially from one part of the body to the next and from one patient to the next. Accordingly, the suturing requirements also will vary. The medical student also must learn to perform required surgery on blood vessels of various sizes and on tendons and ligaments having a range of possible sizes and tensions. The medical student must also practice suturing techniques both in readily accessible locations and in relatively inaccessible locations.

Some of the initial surgical training of medical students is performed on cadavers or on animals. However, both cadavers and animals for surgical training are relatively expensive. Additionally, many humane societies vehemently oppose the performance of unnecessary surgery on animals.

Certain teaching aids are available for one or more aspects of surgical training. For example, U.S. Pat. No. 3,775,865 which issued to Rowan on July 24, 1972 shows an aid to teach the suturing of tubular members, such as blood vessels, which are disposed in relatively inaccessible locations. In particular, the device shown in U.S. Pat. No. 3,775,865 includes a board to which a longitudinally severed tubular member may be secured, such that the tubular member is generally parallel to the board. A relatively short cylinder extending perpendicular to the board is mounted over the tubular member. The cylinder is intended to simulate a body cavity in which the tubular member, such as a blood vessel, may be disposed. The surgical student may then practice suturing the relatively inaccessible tubular member.

Another teaching aid for surgical students is shown in U.S. Pat. No. 4,321,047 which issued to Landis on Mar. 23, 1982. The teaching aid shown in U.S. Pat. No. 4,321,047 is primarily intended to teach the reconnection of transversely severed tubular members. The apparatus includes sensing means which will produce an appropriate signal when the respective halves of the severed tubes are appropriately connected to one another.

The prior art teaching aids for surgical students have several deficiencies. In particular, with the exception of animals and cadavers, the prior art teaching aids do not provide the medical student with the relatively large number of different surgical demands that are likely to be encountered simultaneously or in rapid succession. Thus, while a teaching aid may train the medical student as to the techniques for suturing a severed blood vessel, the prior art teaching aids typically offered no simultaneous training as to the incision through the skin, fat and muscle tissue to reach the blood vessel that ultimately must be sutured. Similarly, the prior art teaching aids do not account for the likelihood that a portion of nerve, tendon, ligament, intestine or the like might also have to be severed and ultimately sutured as part of the same surgical procedure. Additionally, the prior art teaching aids generally were not geared toward teaching the surgical student to react quickly to clamp a blood vessel that may have been severed in the initial incision. The prior art teaching aids also generally were not geared toward the repeated practicing of very simple but important suturing techniques.

In addition to the technical deficiencies of the prior art teaching aids, there have been significant practical deficiencies. For example, the prior art teaching aids were not readily portable for enabling the student to use a particular teaching aid both at the learning institution and at his or her residence. Additionally, the prior art teaching aids were not well suited to carrying the various surgical instruments that would be used in practicing the surgical techniques.

In view of the above, it is an object of the subject invention to provide a surgical teaching aid that realistically simulates a broad range of circumstances that are likely to be encountered during actual surgery.

It is another object of the subject invention to provide a surgical teaching aid that simulates a large number of parts of the body and that facilitates replacement of the various components of the teaching aid after repeated use.

It is a further object of the subject invention to provide a teaching aid wherein the size, shape and tension of various portions of the teaching aid can be readily adjusted.

Another object of the subject invention is to provide a teaching aid that is easily portable.

Still another object of the subject invention is to provide a surgical teaching aid that can readily store various surgical instruments that may be employed in using the teaching aid.

In addition an important object of the subject invention is to provide to all students of surgery, i.e., medical students, interns, residents and practicing surgeons and veterinary surgeons, the opportunity of acquiring *virtuosity* which can only be achieved by repeated exercises or long hours of practice on such a drill board or on animals or patients.

SUMMARY OF THE INVENTION

The subject invention is directed to a portable surgical teaching aid which comprises a plurality of replaceable components which have respective sizes, textures and/or color to simulate various parts of a surgical patient. The teaching aid may be manufactured from a lightweight material, and may be of a size that can be readily transported by the medical student.

The teaching aid preferably comprises a plurality of separate compartments each of which may represent one or more parts of a body that may be encountered during surgery. The teaching aid may comprise a bottom wall to which mounting means may be affixed. The mounting means, for example, may comprise suction cups, rubber feet or a high-friction coating which will keep the teaching aid relatively stationary on a planar surface such as a desk or table, thereby permitting the medical student to realistically employ both hands while practicing a particular surgical technique, while maintaining the simulated patient relatively still. The teaching aid may further comprise a plurality of substantially upstanding sidewalls connected to and extending from the bottom wall. The sidewalls may define portions of various compartments disposed within the teaching aid.

Preferably, the teaching aid comprises at least one means on which the medical student may practice suturing techniques. The means for practicing suturing techniques may comprise at least one hook about which the medical student may practice tying surgical knots. In particular, the teaching aid may comprise a first hook which is substantially unobstructed and relatively accessible to the student, and a second hook which is at least partly obstructed to simulate a relatively inaccessible location on a patient. The obstruction may comprise a clear plastic tubular member surrounding the hook.

The teaching aid may further comprise replaceable means in which the surgical incisions may be practiced. More particularly, the teaching aid may comprise a composite material replaceably mounted therein to simulate the skin and tissue adjacent thereto on a patient. The simulated tissue may be releasably secured to the teaching aid by VELCRO, snaps or the like such that the simulated tissue may be replaced after a number of practice incisions have been made. The composite material which simulates the tissue may comprise a top layer which may be formed from leather, suede, or the like to simulate skin. The top layer, as for instance in the case of the abdominal wall, may be adhered to a high density foam material to simulate the subcutaneous fat and a bottom or fascia layer formed from a stretchable pliable elastic substance such as rubber or the like to simulate the fascia and one or more layers of fat or muscle adjacent to the skin. Portions of the high density foam may be injected with a colored ink or dye to simulate blood vessels extending through the tissue. The medical student may practice making incisions through at least the top layer simulating the outer skin of a patient and the intermediate layer which simulates additional layers of tissue. The student may be required to then employ surgical clamps to clamp the severed blood vessels simulated by the injected dye or silicone in the intermediate layer. The teaching aid may include support means for providing the composite material with a selected nonplanar configuration. The support means may comprise a bowed piece of flexible plastic disposed between retaining means in a selected compartment of the teaching aid. The support means may be replaceable to change the contour, simulating the abdominal wall.

The teaching aid may further comprise synthetic blood vessels removably mounted in a compartment of the teaching aid. The blood vessels preferably are tubular in cross-section and may be formed from a material such as GORTEX, DACRON or other material which simulates synthetic vascular tissue. The medical student may practice repeatedly cutting, suturing and anastomosing the simulated blood vessels, i.e. end-to-end anastomosing, end-to-side anastomosing and side-to-side anastomosing. In a similar manner, compartments of the teaching aid may include material to simulate tendon or nerve tissue. The simulated tendon or nerve tissue may be formed from a pliable solid rubber cord, as opposed to the hollow tubular material employed to simulate blood vessels.

The teaching aid may further comprise simulated intestinal tissue, removably mounted in one or more compartments. The intestinal tissue may be formed from one hollow flexible tube disposed within another, to simulate the multilayer tissue of the intestine so that end-to-end, end-to-side and side-to-side anastomosing can be carried out in the two layer closures.

The compartments in which the simulated blood vessels, tendons, nerves and intestines are disposed may comprise a pair of generally parallel walls removably mounted in the teaching aid. Each wall may have at least one aperture extending therethrough for receiving a simulated blood vessel, nerve, tendon or intestine. The tubular material may be secured to the aperture by fastening means, such as a generally conical member having a head larger than the aperture in the removable wall, but having a smaller dimensioned portion which may be forced fit and frictionally retained in the tubular member. The removable walls may be slideably inserted into grooves formed in walls of the teaching aid. The teaching aid may further comprise tension strips adjacent one or more compartments thereof. The tension strips may comprise elongated strips of relatively hard rubber having razor slits formed therein. The medical student may insert the suture into the slits to achieve the required tension and position as "stay sutures" for completing the suturing in the various simulated tissues included in the teaching aid.

The teaching aid may further comprise a tension tying device to enable the medical student to practice tying "tension ties" and suturing varying tensions. The tension tying device may comprise a relatively elastic material stretched between two retaining means on the teaching aid. Preferably, the elastic material may be adjustable between the retaining means such that the tension can be adjusted in accordance wtih the particular tissue being simulated.

The teaching aid may further comprise a removable cover and a compartment dimensioned to receive surgical instruments, suturing materials or the like.

DETAILED DESCRIPTION OF THE PREFERRED EMBODIMENT

Figure 1:
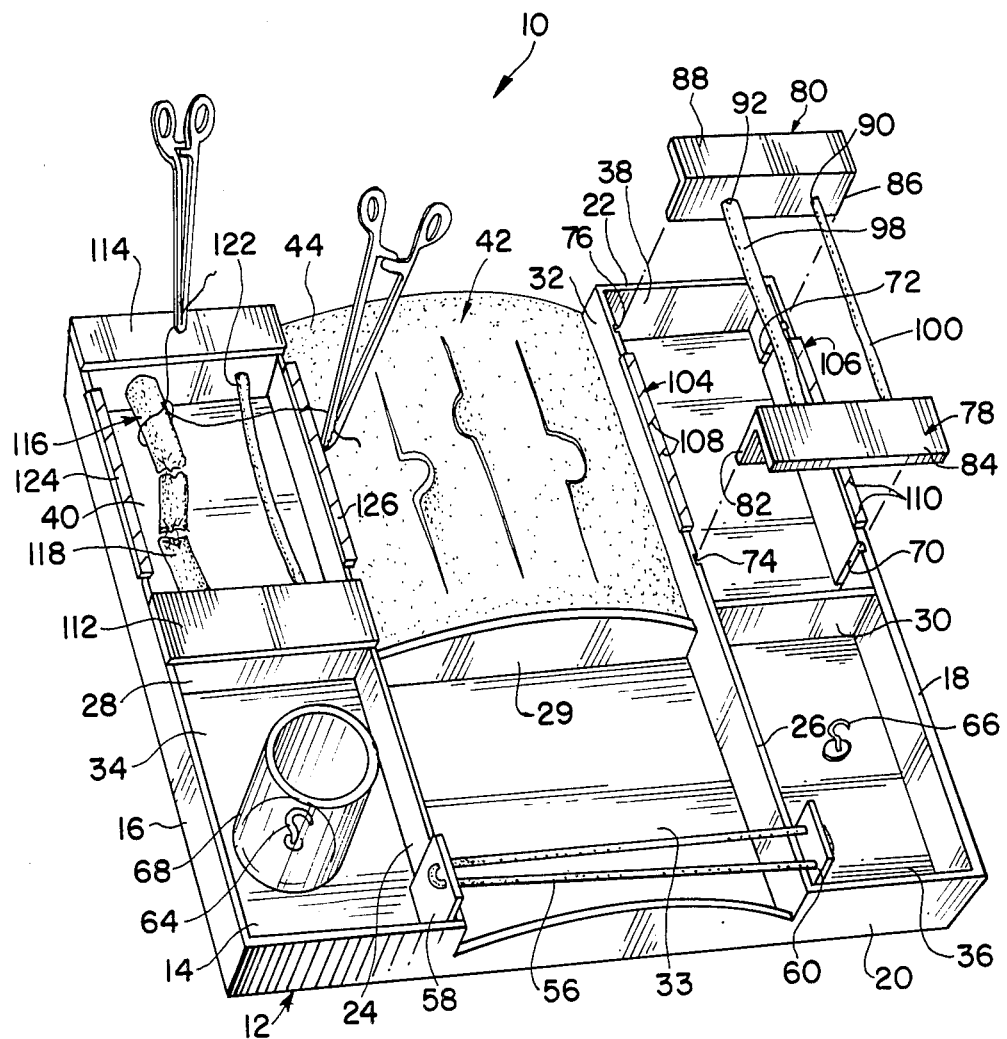
FIG. 1 is an exploded perspective view of a teaching aid in accordance with the subject invention.
Figure 2:
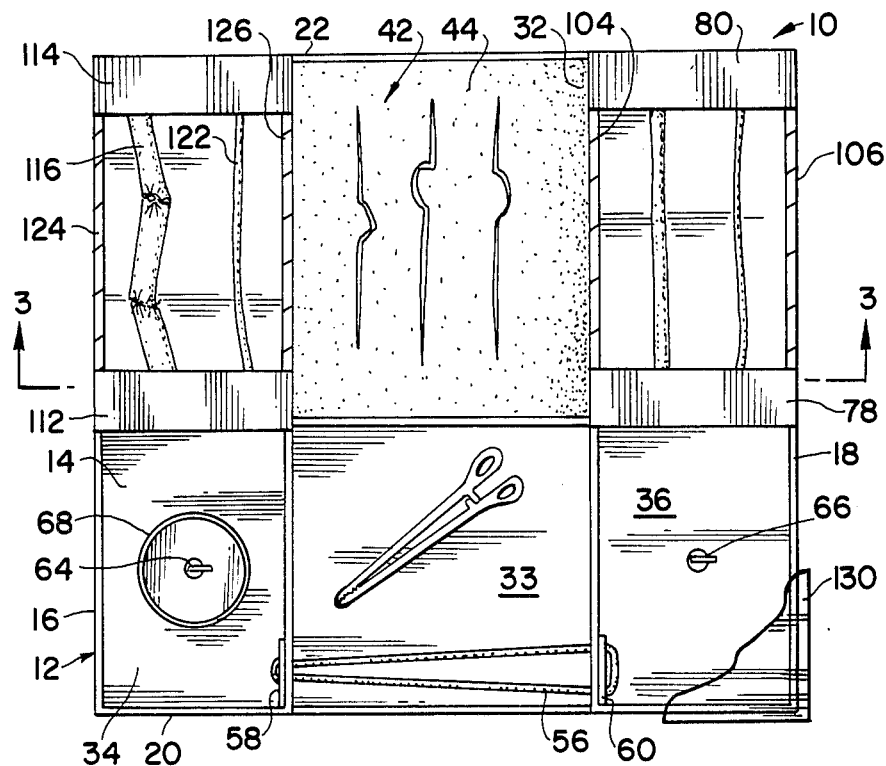
FIG. 2 is a top plan view of the teaching aid shown in FIG. 1.
Figure 3:
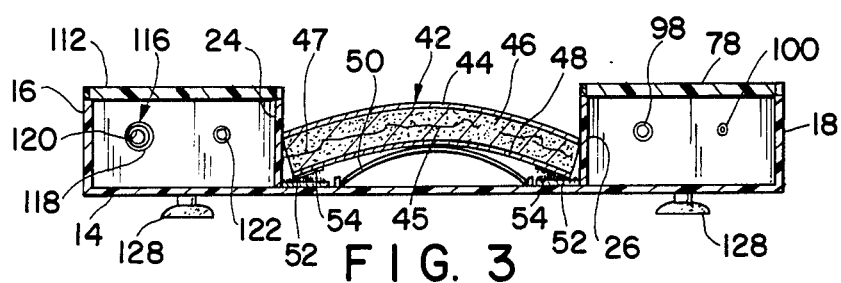
FIG. 3 is a cross-sectional view taken along line 3—3 in FIG. 2.
Figure 4:
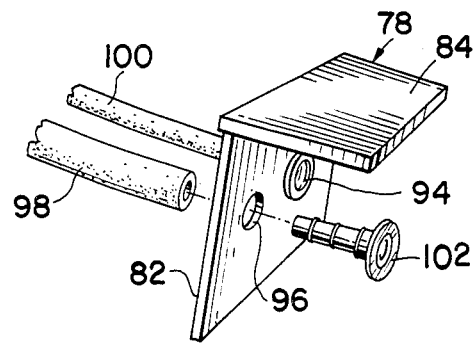
FIG. 4 is a perspective view of a removable wall and a simulated blood vessel in accordance with the subject invention.

The teaching aid of the subject invention is illustrated in FIGS. 1-3, and is identified generally by the numeral 10. The teaching aid 10 comprises a generally flat tray 12 which preferably is formed from a rigid but lightweight plastic material. The tray 12 is small enough to be conveniently transported by a medical student, yet large enough to realistically simulate various aspects of surgery as explained in greater detail below. The preferred embodiment of the tray 12 as illustrated herein is approximately one foot square with a height of approximately two inches.

The tray 12 comprises a substantially planar bottom wall 14, a pair of opposed sidewalls 16 and 18 rigidly connected to and extending orthogonally from the bottom wall 14, and a pair of opposed end walls 20 and 22 rigidly connected to and extending from the bottom wall 14 and between the sidewalls 16 and 18. The tray 12 further comprises a pair of longitudinal dividers 24 and 26 extending orthogonal to the bottom wall 14 and generally parallel to the sidewalls 16 and 18 for the entire distance between the opposed end walls 20 and 22.

The tray 14 further comprises rigid transverse walls 28, 29 and 30. More particularly, the transverse wall 28 extends between the sidewall 16 and the longitudinal divider 24, the transverse wall 29 extends between the longitudinal dividers 24 and 26 and the transverse wall 30 extends between the sidewall 18 and the longitudinal divider 26. As a result of the above described construction, the tray 12 defines two central compartments 32 and 33, and four side compartments 34, 36, 38 and 40. Each of the compartments 32-40 can be employed by a medical student for separate distinct functions as explained in greater detail below.

The central compartment 32 includes a synthetic skin tissue 42, which as shown in FIG. 3 comprises an outer layer 44, an intermediate layer 46, and an inner layer 48. The outer layer 44 preferably is formed from leather, suede or a synthetic material having a similar texture and consistency to resemble the outer layer of skin of a patient. The intermediate layer 46 preferably is formed from a high density foam which may simulate additional layers of tissues such as skin, fat and/or muscle tissue. The intermediate layer 46 includes long thin dyed portions 47 extending randomly therethrough to simulate blood vessels. The bottom layer 48 may be a latex rubber which is primarily provided for support and for simulating fascia. The synthetic skin tissue 42 is provided to enable the medical student to practice both incisions and stitching of skin and adjacent tissue. To make this simulation more realistic, the central compartment 12 is provided with an arcuate support 50 which is formed from an upwardly bowed plastic material having a thickness sufficient to support the synthetic fascia tissue 48, which would be under slight tension, thereby accurately simulating many parts of the body. The support 50 may be replaced by supports of different dimensions to alter the contour.

The synthetic skin tissue 42 is removably retained in the central compartment 32 by pairs of mateable VELCRO strips 52 and 54 on the longitudinal sides of the synthetic skin tissue 42. One half 52 of each mateable pair of VELCRO fastening strips may be adhered directly to the bottom wall 14 of the tray 12, while the other half 54 may be secured to the bottom layer 48 of the synthetic skin tissue 42.

The central compartment 33 of the tray 12 is provided with a tension-tying device 56 to enable the medical student to practice tying knots at different tensions. The tension-tying device 56 may be rubber tube stretched substantially the entire distance between the longitudinal dividers 24 and 26. In particular, mounting portions 58 and 60 are affixed respectively to the longitudinal dividers 24 and 26, and each is provided with a pair of apertures extending therethrough. The rubber tube comprising the tension-tying device 56 is threaded through the mounting wall 58, and the opposed ends of the tubing are then threaded through the apertures in the mounting wall 60. The respective ends of the rubber tube of tension-tying device 56 may be cut to a length that will achieve the desired degree of tensioning, and may then be connected to one another. The surgical student may practice tying knots of different tensions on the tension-tying device 56. Portions of the center comparment 33 may be used to store surgical equipment.

The side compartments 34 and 36 of the tray 12 enable the medical student to repeatedly practice suturing techniques. The compartments 34 and 36 are provided with hooks 64 and 66 respectively secured to and extending from the bottom wall 14 of the tray 12. The hooks 64 and 66 provide a convenient means about which various knot tying techniques may be practiced. The hook 66 is relatively accessible. However, the hook 64 is surrounded by a clear plastic tube 68 which extends rigidly from the bottom wall 14 in compartment 34. More particularly, the tube 68 has an inside diameter of approximately two inches and extends a distance of between 1.5 and 2.0 inches above the hook 64. The combination of the hook 64 and the clear plastic tube 68 simulates a suturing that must be performed in an inaccessible deep location.

Side compartments 38 and 40 include replaceable lengths of simulated tissues that may be severed by the student and then sutured together. The compartment 38 is provided with grooves 70 and 72 extending into the sidewall 18 and grooves 74 and 76 extending into the longitudinal divider 26. The grooves 70-76 are dimensioned to slidably receive retainers 78 and 80. In particular, the retainer 78 comprises a wall 82 which is dimensioned to be slidably received in the grooves 70 and 74, and a cover 84 which extends substantially perpendicular to the upright wall 82, and functions both as a handle and as a cover for the connections of the simulated tissues as explained below. In a similar manner, the retainer 80 includes a wall 86 which is dimensioned to be slidably received into the grooves 72 and 76 and a cover 88 extending perpendicular to the wall 86. The wall 86 is provided with a pair of apertures 90 and 92 which are different sizes. Similarly, the wall 82 is provided with a pair of apertures 94 and 96 respectively. The apertures 90-96 are dimensioned to receive tubes 98 and 100 which simulate an artery and a vein respectively. The simulated artery 98 is urged through the apertures 92 and 96 in the walls 86 and 82 respectively, and is held in position by generally conical fastening means 102 which urge the tube 98 outwardly and tightly against the circumference of the apertures 92 and 96. In a similar manner, the simulated vein 100 is fixedly retained between the walls 82 and 86. The student may use this aspect of the teaching aid by severing the appropriate artery or vein 98 and 100 and then suturing the severed halves together again with varying suturing techniques.

To facilitate the tensioning of the free end of the suture used for the simulated artery and vein 98 and 100, tension strips 104 and 106 are secured respectively to the longitudinal divider 26 and the sidewall 18 adjacent compartment 38. The tensioning strips 104 and 106 are provided with spaced apart razor slices 108 and 110 into which a portion of the suture may be urged and frictionally maintained. The simulated artery 98 and vein 100 may be cut and anastomosed several times by the medical student. However, after several such cutting and suturing exercises, the simulated artery 98 or vein 100 may be replaced. The replacement procedure is efficiently carried out by merely removing the retainers 78 and 80 from the compartment 38. The conical fastening devices 102 are then removed from the artery 98 or vein 100, and a new section of simulated artery 98 or vein 100 is put in position as explained above.

The compartment 40 is similar to the compartment 38 described above. More particularly, the compartment 40 is characterized by pairs of grooves into which retainers 112 and 114 are slideably inserted. The retainers 112 and 114 are used to replaceably retain a simulated intestinal tissue 116 which is formed with an outer tubular layer 118 and an inner tubular layer 120. The simulated intestinal tissue 116 is connected to the retainers 112 and 114 just as the simulated artery 98 is secured to the retainers 78 and 80 described above. A simulated tendon or nerve tissue 122 also extends between the retainers 112 and 114. However, the simulated nerve or tendon tissue 122 may be formed from a solid but pliable rubber cord that may be secured by a spring clamp means or by appropriately dimensioned knots. The compartment 40 further is provided with tension strips 124 and 126 for frictionally retaining the sutures to achieve the desired stay corners sutures (three point surgery) during varying tissue repairs. Both the simulated intestinal tissue 116 and the simulated tendon or nerve tissue 122 may be cut and repaired by the student.

The teaching aid 10 further comprises a plurality of suction cups 128 mounted to the bottom wall 14 of tray 12. The suction cups 128 ensure stationary positioning of teaching aid 10, thus freeing both hands of the medical student.

The teaching aid 10 may be used to repeatedly practice a particular surgical technique such as the simple unobstructed suturing on hook 66, the obstructed suturing on hook 64 or cutting and suturing the simulated skin tissue 42. Alternatively, the medical student can proceed through a simulated operation beginning with the incision into the simulated skin tissue 42. The injected substances 74 can simulate a severed blood vessel below the surface of the skin tissue 42 which must be clamped by the medical student in a timely manner. This surgical exercise may then further include a specified sequence of practice knot tying under tension and of suturing simulated blood vessels 98, 100, simulated intestines 116 and simulated tendons or nerves 122. The surgical exercise may require the student to tie knots on tissue 56 having graded tensions. The exercise may further require the student to place a selected number of practice stitches on an inaccessible organ simulated by the hook 64. The sequence of the exercise may be varied in accordance with the particular type of surgical procedure being simulated. Additionally, all of the simulated tissue of the teaching aid 10 can be replaced as needed thereby ensuring that the teachng aid 10 may be employed virtually indefinitely. The teaching aid 10 may further be employed with a cover 130, to enable various surgical instruments to be placed in the tray 14, and retained in position by a suitable cover to render the teaching aid 10 portable.

In summary, the teaching aid of the subject invention comprises a tray having a plurality of separate compartments therein. The compartments include various types of simulated tissue replaceably positioned therein. In particualar, the compartments of the teaching aid include simulated skin tissue supported in an arcuate alignment which simulates the contour of a patient. The teaching aid further includes simulated blood vessels, simulated intestinal tissue and simulated nerves and tendons. The teaching aid may be employed to enable a student of surgery to practice cutting, suturing and repairing tissues subjected to varying tension. Additionally, the teaching aid comprises hooks that may be accessible or inaccessible and about which various knot tying techniques may be practiced.

While the invention has been described with respect to certain preferred embodiments, it is apparent that various changes can be made without departing from the scope of the invention as defined by the appended claims.

What is claimed is:

1. A teaching aid for teaching surgical techniques, said teaching aid comprising a tray having a plurality of walls forming a plurality of separate compartments therein, at least one said compartment including simulated tissue removably mounted therein, at least one flexible tube replaceably mounted in said tray, said tube being formed from a material that can be severed and sutured, whereby said tube simulates a tubular tissue of a patient, and wherein said plurality of walls includes a pair of walls removably mounted in at least one said compartment, the walls in said pair of walls comprising at least one aperture extending therethrough, said apertures being dimensioned to receive said tube.

2. A teaching aid as in claim 1 wherein one said compartment comprises an arcuate supporting surface and a simulated skin tissue removably mounted on said arcuate supporting surface.

3. A teaching aid as in claim 2 wherein the simulated skin tissue comprises a plurality of layers secured in generally face to face relationship, said plurality of layers comprising an outer layer simulating the outer layer of skin, and at least one inner layer simulating layers of tissue adjacent to said outer layer of skin.

4. A teaching aid as in claim 3 wherein at least one of said inner layers comprises at least one simulated blood vessel extending therethrough.

5. A teaching aid as in claim 4 wherein the simulated blood vessel in said skin tissue comprises at least one dye compound injected therein.

6. A teaching aid as in claim 4 wherein the outer layer is formed from leather and wherein at least one said inner layer is formed from a synthetic foam.

7. A teaching aid as in claim 2 wherein the synthetic skin tissue comprises a plurality of means for releasably attaching said synthetic skin tissue to said tray.

8. A teaching aid as in claim 2 wherein the arcuate supporting surface is resilient.

9. A teaching aid as in claim 1 wherein said synthetic tissue comprises at least one tube extending between a pair of spaced apart retainers 10. A teaching aid as in claim 1 comprising at least one hook rigidly mounted to said tray, whereby a student may repeatedly practice tying knots on said hook.

11. A teaching aid as in claim 10 comprising a plurality of hooks, and further comprising an open ended tube surrounding one said hook, whereby said tube simulates an obstruction about a location to be sutured.

12. A teaching aid as in claim 1 further comprising means for securing said tube to the apertures in said walls.

13. A teaching aid as in claim 1 wherein at least one said tube comprises an inner flexible tube and an outer flexible tube.

14. A teaching aid as in claim 1 comprising means for securing a tubular material under a plurality of different selected tensions.

15. A teaching aid as in claim 1 further comprising mounting means for securely retaining said tray on a generally planar surface.

16. A teaching aid as in claim 1 further comprising a removable cover mounted to said tray and covering the respective compartments thereof.

17. A teaching aid as in claim 1 further comprising means for tensioning sutures securely mounted to said tray, said means for tensioning sutures comprising a strip of material having a plurality of slits therein, said slits being dimensioned to frictionally retain suture material.

18. A teaching aid as in claim 1 comprising at least one flexible tube replaceably mounted in said tray which simulates nerve tissue.

19. A teaching aid for teaching surgical techniques, said teaching aid comprising a tray having a bottom wall and a plurality of upstanding walls extending from said bottom wall and defining a plurality of compartments in said tray, a simulated skin tissue releasably mounted in one said compartment of said tray, said simulated skin tissue comprising a plurality of separate layers, at least one flexible tube replaceably mounted in at least one other compartment of said tray, said tube being formed from a material that can be severed and sutured, said plurality of walls including a pair of walls removably mounted in at least one side compartment, the walls in said pair of walls comprising at least one aperture being dimensioned to receive said tube, means for securing sutures securely mounted to said tray and substantially adjacent at least one compartment thereof and hook means for practicing sutures thereon.

20. A teaching aid as in claim 17 further comprising arcuate support means mounted to said tray in the compartment thereof having the simulated skin tissue, whereby the arcuate support means provides said simulated skin tissue with an arcuate contour.

21. A teaching aid as in claim 17 further comprising a plurality of suction cups mounted to said tray to securely retain said tray on a planar surface.

22. A teaching aid as in claim 17 further comprising a removable cover mounted to said tray.

* * * * *